(12) United States Patent
Ioffe et al.

(10) Patent No.: US 9,286,549 B1
(45) Date of Patent: Mar. 15, 2016

(54) SUBLINEAR TIME CLASSIFICATION VIA FEATURE PADDING AND HASHING

(71) Applicant: Google Inc., Mountain View, CA (US)

(72) Inventors: Sergey Ioffe, Mountain View, CA (US); Alexander Toshkov Toshev, San Francisco, CA (US)

(73) Assignee: Google Inc., Mountain View, CA (US)

( * ) Notice: Subject to any disclaimer, the term of this patent is extended or adjusted under 35 U.S.C. 154(b) by 304 days.

(21) Appl. No.: 13/941,812

(22) Filed: Jul. 15, 2013

(51) Int. Cl.
*G06K 9/68* (2006.01)
*G06K 9/70* (2006.01)
*G06K 9/62* (2006.01)

(52) U.S. Cl.
CPC ..................................... *G06K 9/628* (2013.01)

(58) Field of Classification Search
None
See application file for complete search history.

(56) References Cited

U.S. PATENT DOCUMENTS

| | | | |
|---|---|---|---|
| 8,199,973 B2 | 6/2012 | Noguchi et al. | |
| 8,254,699 B1 | 8/2012 | Zhao et al. | |
| 8,428,397 B1 | 4/2013 | Brandt | |
| 8,463,036 B1 * | 6/2013 | Ramesh et al. | 382/170 |
| 8,515,212 B1 * | 8/2013 | Bengio et al. | 382/305 |
| 2007/0081664 A1 * | 4/2007 | Avidan et al. | 380/28 |
| 2015/0170004 A1 * | 6/2015 | Song et al. | G06K 9/68 |

OTHER PUBLICATIONS

Philbin et al.,"Lost in Quantization: Improving Particular Object Retrieval in Large Scale Image Databases", IEEE Xplore, Conference Location: Anchorage, AK, ISSN: 1063-6919, Jun. 28, 2008, 8 pages.

* cited by examiner

*Primary Examiner* — Vikkram Bali
(74) *Attorney, Agent, or Firm* — Fish & Richardson P.C.

(57) ABSTRACT

A linear function describing a framework for identifying an object of class k in an image sample x may be described by: $w_k * x + b_k$, where $b_k$ is the bias term. The higher the value obtained for a particular classifier, the better the match or strength of identity. A method is disclosed for classifier and/or content padding to convert dot-products to distances, applying a hashing and/or nearest neighbor technique on the resulting padded vectors, and preprocessing that may improve the hash entropy. A vector for an image, an audio, and/or a video may be received. One or more classifier vectors may be obtained. A padded image, video, and/or audio vector and classifier vector may be generated. A dot product may be approximated and a hashing and/or nearest neighbor technique may be performed on the approximated dot product to identify at least one class (or object) present in the image, video, and/or audio.

21 Claims, 4 Drawing Sheets

SUBLINEAR TIME CLASSIFICATION VIA FEATURE PADDING AND HASHING

BACKGROUND

An image may contain a variety of objects, such as a bicycle, a car, a soda can, an apple, etc. Multiclass classification methods can find which objects are present in a given object. A common framework for such classification is $$\text{label} = \arg\max_k w_k * x,$$

where k is the name of the object (e.g., "wheel"), $w_k$ is a learned vector useful in determining if the object is in an image (for example, $w_{wheel}$ is a "wheel" vector) and x is a vector representing the image against which $w_k$ is evaluated. An object may belong to a class of objects. For example, a class of objects may be car and an object may be a particular make (e.g., manufacturer), style (e.g., two/four door sedan, sports car, truck, etc.), and/or particular vehicle. As used herein, a class may be used generally to describe an object. For example, reference to a classifier vector may include an object vector. In an implementation, a class may consist of one object and a classifier vector can be an object vector. The term "label" may be the score that results when a particular object vector is evaluated against a given image. For example, a higher label score in the above example may indicate a higher likelihood that the tested image contains a wheel. The label may indicate, for example, that an object such as a bicycle is present in an image, or that an object belonging to the class "automobile" is present in the image.

The term $w_k * x$ refers to the dot product between $w_k$ and x. One way to determine which objects (or classes of objects) are in an image is to analyze the image against all of the known object vectors. But such a linear scan of all object vectors (or classifier vectors) may be inefficient when the number of possible objects (and therefore object vectors) is large. Tree-based and hash-based methods have been utilized to improve search efficiency, for example, in sublinear time nearest-neighbor searches. Although such techniques can be useful, they depend on a distance being defined between vectors as opposed to the dot product shown above.

BRIEF SUMMARY

According to an implementation of the disclosed subject matter, an image vector may be received. One or more classifier vectors (or object vectors) may be obtained. Each classifier vector (or object vector) may correspond to at least one class (or object). A padded image vector may be generated by a processor. One or more padded classifier vectors (or object vectors) may be generated by the processor. Each generated classifier vector (or object vector) may correspond to the one or more classifier vectors (or object vectors). Each generated classifier vector (or object vector) may be padded with a scalar corresponding to the classifier vector (or object vector). A dot product between the padded image vector and each of the padded classifier vectors (or object vectors) may be approximated. In some configurations, a hash technique may be performed on at least one of the image vector and the classifier vector to approximate the dot product. In some configurations a nearest neighbor search may be performed based on the approximated dot product to identify at least one class (or object) of the image.

According to an implementation of the disclosed subject matter, a video vector may be received. One or more classifier vectors (or object vectors) may be obtained. Each classifier vector (or object vector) may correspond to at least one class (or object). A padded video vector may be generated by a processor. One or more padded classifier vectors (or object vectors) may be generated by the processor. Each generated classifier vector (or object vector) may correspond to the one or more classifier vectors (or object vectors). Each generated classifier vector (or object vector) may be padded with a scalar corresponding to the classifier vector (or object vector). A dot product between the padded video vector and each of the padded classifier vectors (or object vectors) may be approximated. In some configurations, a hash technique may be performed on at least one of the video vector and the classifier vector to approximate the dot product. In some configurations a nearest neighbor search may be performed based on the approximated dot product to identify at least one class (or object) of the video.

According to an implementation of the disclosed subject matter, an audio which has an audio vector may be received. One or more classifier vectors (or object vectors) may be obtained. Each classifier vector (or object vector) may correspond to at least one class (or object). A padded audio vector may be generated by a processor. One or more padded classifier vectors (or object vectors) may be generated by the processor. Each generated classifier vector (or object vector) may correspond to the one or more classifier vectors (or object vectors). Each generated classifier vector (or object vector) may be padded with a scalar corresponding to the classifier vector (or object vector). A dot product between the padded audio vector and each of the padded classifier vectors (or object vectors) may be approximated. In some configurations, a hash technique may be performed on at least one of the audio vector and the classifier vector to approximate the dot product. In some configurations a nearest neighbor search may be performed based on the approximated dot product to identify at least one class (or object) of the audio.

Implementations disclosed herein provide an efficient method of identifying one or more classes (or objects) in an image, audio, a video, text, etc. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

An implementation can convert dot-products to distances by padding image and classifier vectors (or object vectors) to convert dot-products to distances, hash the resulting padded features, and use preprocessing techniques that can improve the hash entropy. As used herein, the term "classifier vector" can refer to a vector that characterizes a class or an object. Thus, "classifier vector" is interchangeable with "object vector". The closest image classifiers can be identified using sublinear, distance-based searches such as nearest neighbor searches. As a result, an image (or other media type such as video, audio, text, etc.) may be more quickly and efficiently classified in terms of the objects it may contain. As stated earlier, an object may belong to a particular class and a classifier vector may refer to an object or class of objects. Similarly, reference to a class may refer to an object or class of objects.

In an implementation, a linear function describing a framework for identifying an object of class k in an image sample x (also, a "feature vector") may be described by: $w_k^* x + b_k$, where $b_k$ is the bias term. The higher the value obtained for a particular classifier, the better the match. In other words, finding the k's (classes) for which this expression is maximized for an image can indicate which objects are contained within the image. The bias $b_k$ may be redundant because a "1" may be appended to x, and $b_k$ may be appended to $w_k$. A feature vector (a representation of one or more features of an image) may be padded in a different way than a classifier vector.

While hashing (such as winner-take-all hashing) may be used to approximate the maximum dot product, hashing methods generally do not accurately approximate dot products. The present implementation can more accurately convert dot products to distances than hashing methods. Once the dot products are converted to distances, sublinear, distance-based techniques can be applied to more efficiently classify an image and/or identify an object in the image.

Figure 1:
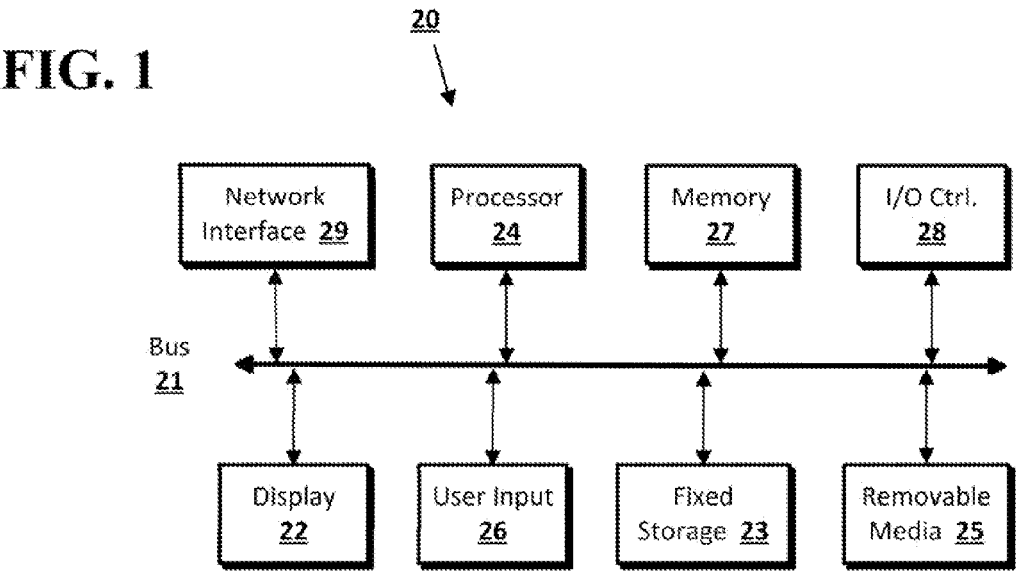
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
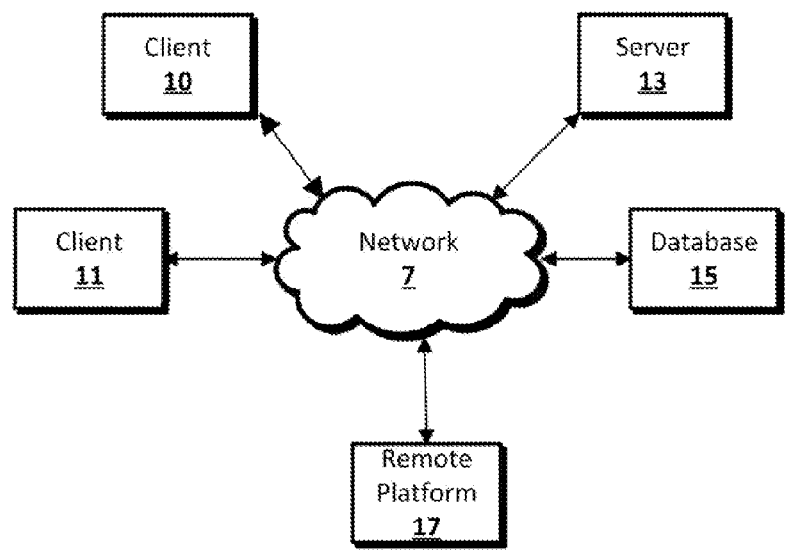
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In an implementation, one or more image vectors may be received at 310. For example, in some configurations, image processing may be utilized to extract one or more features from an image to produce one or more feature vectors for the image (e.g., one or more image vectors). Many image processing algorithms, such as Speeded-Up Robust Features ("SURF") and Scale Invariant Feature Transform ("SIFT") may be used to obtain one or more vectors that represent or describe the image. For example, feature vectors may be obtained for edge detection, color detection, color gradient, etc. A vector for the image may be stored in a computer readable medium and retrieved for comparison.

One or more classifier vectors may be obtained 320. As stated earlier, a classifier vector may refer to an object vector and/or class of objects that may be found in an image. For example, a classifier vector may describe an object such as a bicycle, an apple, or a narwhal. A classifier engine may be trained to identify objects of a particular class. For example, a car classifier engine may be used to identify a car regardless of its make while a more specific classifier engine may be trained to identify a car based on its make. A classifier engine may be trained using, for example, SVM or other machine learning techniques. In the context of text, a classifier vector may be utilized to identify a topic of the text. For example, a classifier vector may describe an audio type (e.g., rock, jazz, classical). A classifier vector may also describe a movie, a movie still, an actor in a movie, and so on.

As stated earlier, a framework determining if an object is present in an image is label =arg $\max_k w_k^* x$, where $w_k$ is a learned vector for label (e.g., class) k and x is the image. One or more padded image vectors may be generated by a processor at 330. For example, Equation 1 shows an example of padding an image vector, x, with a zero.

$$x' = [x\ 0]$$ Equation 1

An image vector may be padded with a non-zero number in some configurations. One or more padded classifier vectors may be generated by a processor at 340. Each of the classifier vectors may be padded with a scalar corresponding to the classifier vector. Each padded classifier vector may correspond to the one or more unpadded classifier vectors. The classifier vector for a class of object k, $w_k$, may be padded with a scalar, $a_k$, as shown in Equation 2.

$$w_k' = [Wk\ ak]$$ Equation 2

The scalar, $a_k$, may be selected according to Equations 6 and 7 below. A dot product between the padded image vector and each of the padded classifier vectors may be approximated at 350 utilizing a series of algebraic substitutions. The distance $D_k$ between the padded classifier vector $w'_k$ and the padded image vector x', may be defined as follows:

$$D_k = \|w'_k - x'\|^2 = \|w'_k\|^2 + \|x'\|^2 - 2w'_k{}^* x'$$ Equation 3

Note that $w'_k{}^* x' = w_k{}^* x$.

$$w_k * x + b_k = \frac{(\|w'_k\|^2 + \|x'\|^2 - D_k)}{2} + b_k$$ Equation 4

$$\frac{(\|w_k\|^2 + a_k^2 + \|x\|^2 - D_k)}{2} + b_k$$

$$\frac{-D_k}{2} + \|x\|^2 + \frac{(\|w_k\|^2 + a_k^2 + 2b_k)}{2}$$

Note that $\|x\|^2$ does not depend on classifier k and, consequently, it does not affect the search for the maximum dot product. The last term in Equation 4 may not be constant in general. In some configurations it may be made constant.

$$\|w_k\|^2 + a_k^2 + 2b_k = M$$ Equation 5

It is possible to ensure that M does not depend on k by setting M and $a_k$ as follows:

$$M = \max_k \|w_k\|^2 + 2b_k$$ Equation 6

$$a_k = \pm \sqrt{(M - \|w_k\|^2 - 2b_k)}$$ Equation 7

The +/− in Equation 7 may be selected arbitrarily. In some configurations, a +/− may be randomly assigned to each classifier $w_k$ (e.g., classifier vector) to cause the expected dot product between $W'_k$ and x' (and equivalently, between $w_k$ and x) to be as close to zero as possible. In the instance where $b_k=0$, $\|w'_k\|^2 = M$ is constant. Thus, the original problem may be mapped to Euclidean distance and the vectors can all have the same norm, making it equivalent to cosine-distance search. $b_k=0$ can be accomplished by padding each x with some value t and padding each $w_k$ with $b_k/t$. The value t can be selected based on, for example, how well the resulting nearest-neighbor search approximates an optimum. Thus, the score with respect to a classifier (e.g., label =arg $\max_k w_k^* x$) may be converted into a distance computation between a given image vector and a classifier. The distance computation may be utilized with known nearest neighbor techniques to determine a likelihood (e.g., the highest scoring classifier) that the class (or object) is present in, for example, an image, a video, or audio content.

Padding the image vector (feature vector) converts the problem to one that is similar to a Euclidean nearest neighbor problem, possibly with L2-normalized references. This may allow hash methods to be used to identify at least one class (or object) present in the image. Examples of hash methods that may be used according to implementations disclosed herein include locality sensitive hashing ("LSH"), LSH with random Gaussian projections, E2LSH, or random Gaussian projections thresholded at zero (for a L2-normalized version). In some configurations, a tree-based method such as a spill tree may be used to identify at least one class (or object) present in the image. A skilled artisan will know that many other tree-based methods exist and may be utilized in accordance with the disclosed subject matter. Other techniques for a nearest neighbor determination based on Euclidean distances may be used in accordance with the disclosed subject matter. A hash technique and/or tree-based method may be performed on at least one of the image vector and the classifier vector to approximate the dot product. The resultant hash vectors may be analyzed. For example, the dot products may be approximated as a function of the Hamming distance between the hash embedding of an image vector and the hash embedding of a classifier vector. The approximated dot product may be utilized to identify at least one class (or object) present in an image, a video, or audio content. Similarly, a tree based method may be applied to at least one of the image vector and the classifier vector to approximate the dot product. As with the hash technique, the approximated dot product may be utilized to identify at least one class (or object) present in image, video, or audio content.

Figure 3:
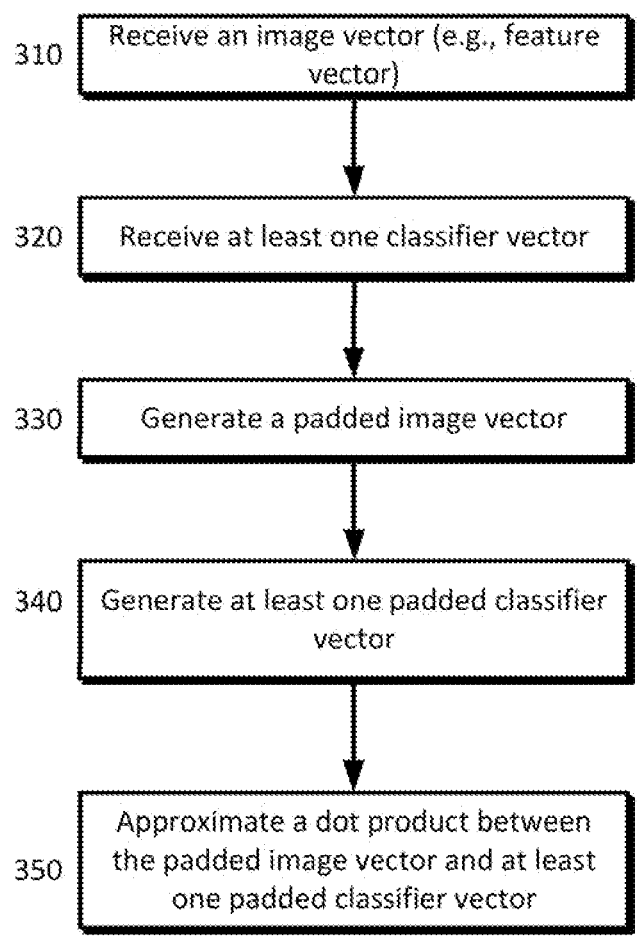
FIG. 3 is an example method for approximating a dot product between a padded image vector and one or more padded classifier vectors.

As an example, thousands of classes may exist for which classifiers have been trained. For each class (such as a bicycle, a car, etc.) a classifier, w, may have been trained using standard techniques (e.g., SVM or other machine learning techniques). A feature vector of an image may describe the image as a vector of Histogram of Oriented Gradients ("HOG") descriptors. HOG may indicate different portions of the image such as how much edge energy exists in different directions. A gradient computation may be performed on the image. The dot product between the HOG classifiers and the gradient computation for the image may yield a score. The dot product may be converted to Euclidean distance utilizing the method disclosed in FIG. 3, for example, and subsequently a hash technique or nearest neighbor technique may be utilized to obtain a score may be obtained for each class (e.g., a score for a bicycle class and a score for a car class). The highest score may indicate a likelihood that the corresponding class (e.g., object) is a part of or is present in the image. As stated above, a similar technique may be applied to other forms of content (e.g., video, audio, etc.). For example, a classifier vector may be utilized as a component of a copyright protection scheme. The classifier vector may describe a particular copyrighted audio composition. It may be utilized to determine whether the audio content (e.g., in video and/or audio files) may contain the copyrighted work.

In some configurations, an image (feature) vector may be preprocessed to increase entropy. A classifier vector and/or the image (feature) vector may be transformed in a way such that it does not change which class may be selected as the one with the highest dot product "score" but it may enable more efficient sublinear retrieval of a result. A transformation of the classifier vector and the image vector may not be identical but should be consistent to preserve the dot products. For example, the first dimensions of each classifier vector may be multiplied by 2 and the first dimension of an image vector may be divided by 2. Note that a linear retrieval applied to a classifier comparison to the image may muddle the set of classifier vectors (e.g., w vectors). Sublinear retrieval may refer to, for example, a nearest neighbor search technique or a hash based search technique as stated earlier. In a tree-based approach, a space of labels may be arranged as a binary tree where, at every node, the set of labels may be split in half. The label for a given image may be determined to be in either the first half of all the labels or the second half of all the labels. Depending on which half of labels the image is determined to be associated with, the labels for that half may be shrunk by a factor of two, for example. The image may be determined to be associated with one of the two new halves of labels. This process may be recursive to narrow down to a single or relatively small number of labels for the image. In this way, the best labels for an image can be obtained sublinearly, i.e., without a direct comparison of the image against all of the possible classifiers.

A hash-based approach, such as LSH, may also be utilized for sublinear retrieval of the best labels. A given image or a representation thereof (e.g., a vector) or a padded w vector, may be converted to a set of discrete hash values. Each of the hash values, either by themselves or by groups of those values, may be used as keys in hash tables. In other words, each hash value or group of hash values can correspond to a given object (class) that may be present in the image. For example, twenty-five hash tables may be obtained, each hash table corresponding to a different class. For each of the hash tables, a key may be generated by taking four hashes for either the class or the image. A search may be performed in each table to identify one of the four hashes in a given table. Twenty-five four-hash groups may be generated from the image. Each of those may serve as a key into one of the twenty-five hash tables and from each of those hash tables, a set of candidate labels may be retrieved. The set of candidate labels may be joined together (e.g., the union may be taken). For each of those labels, the computable dot product may be scored, for example, by a hashing or a nearest neighbor method as described above.

In the example provided above, the set of labels that may be retrieved from each hash table may be substantially smaller than the total set of labels that may be available, even if multiple hash tables are used. Thus, if there are twenty-five hash tables, each of them may yields a set of labels that may be, for example, 1% of all the labels available. Then, even the union of all of those labels may constitute only a quarter of all possible labels. In practice, the savings may be even more dramatic.

One of the common methods for hashing, LSH, may be a random projection method. For random projections, a feature vector, an image vector, and/or one of the padded w vectors and a random vector that may include Gaussian variables which are independent may be obtained and/or generated. The dot product between image vector, for example, and the random Gaussian vector may be computed to yield a value that that may be deemed the random projection. This random projection may be quantized using a fixed quantization generality. The quantized value may become one of the hash values. Such hashes may be useful for the sublinear retrieval methods disclosed herein if they have a reasonable entropy.

For example, for any pair of images or any image and classifier, 99% of the hashes may be reasonably expected to be the same while 1% may be different. Given an infinite number of hashes, the nearest neighbors may be determined albeit by inefficiently utilizing the hashes. Hashes having a high entropy are, therefore, desirable because they provide more signal. A high entropy hash may refer to one that ensures that the data are as spread out as possible. For example, an image vector may have two dimensions and have unit length (e.g., they have a norm of one). Each feature vector may point from the object to some unit circle. If all of these data points happen to be near each other on the unit circle, then these hash points may end up inefficiently utilizing bits. Instead, the centroid of the data may be identified. In an implementation, the method disclosed in FIG. 3 and above may be applied to one or more image vectors. An adjustment value may be subtracted from the one or more image vectors. For example, the mean of the data may be referred to as an adjustment value. The mean of the data may be computed and subtracted from all the data. This may cause the vectors to point in different directions. If all of the vectors do not point in the same direction then their hashes may have a high entropy. By making the vectors more dissimilar their hashes may have a higher entropy and it may make data retrieval more efficient.

As another example of preprocessing an image vector (e.g., a feature vector), and/or a classifier vector, a linear transformation may be applied to the image vector, and/or the classifier vector. This does not affect the dot products. If the number of hashes is small, the linear transforms may be optimized to yield better hash entropy. Many techniques exist for optimizing linear transforms. For example, one method may be a trial and error method with several different linear transforms. For each transform utilized, the hash entropy may be determined. For example, how well the labels are distributed in the hash tables may be computed and the transform for which the entropy is maximized may be selected. Another example of optimizing a transform may utilize the particular hash function families. For example, in the case of random projections if the distance between the vectors is given then a formula may be derived to determine the hash entropy for a given distribution of the distances between the data points. Thus, a linear transformation applied to the data points and the inverse of the linear transformation applied to the model can help us achieve a better hash entropy.

Figure 4:
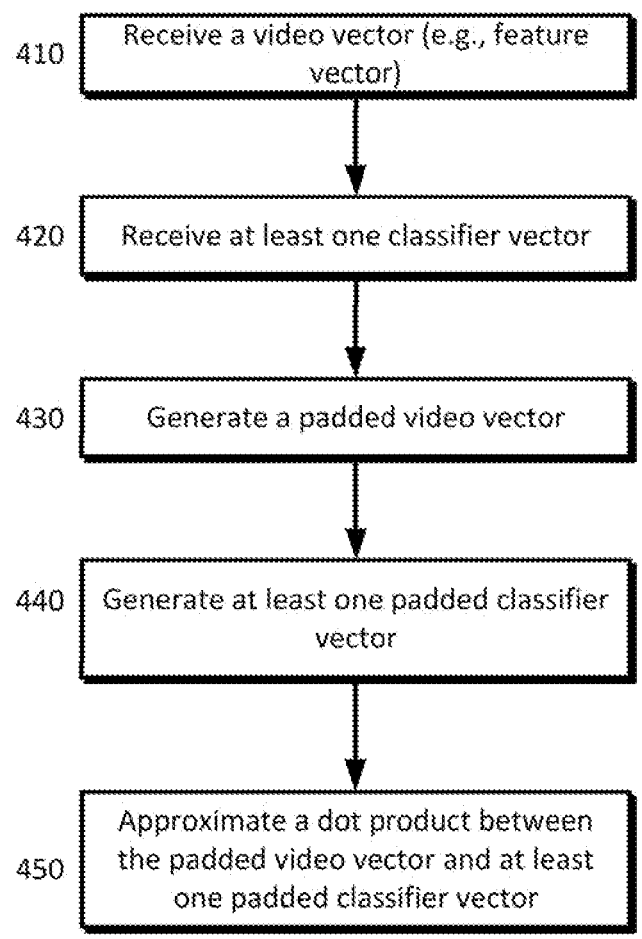
FIG. 4 is an example method for approximating a dot product between a padded video vector and one or more padded classifier vectors.

In an implementation, an example of which is provided in FIG. 4, one or more video vectors may be received at 410. One or more classifier vectors may be obtained at 420. Each classifier vector may correspond to at least one class. One or more padded video vectors may be generated by a processor at 430 as described earlier. One or more classifier vectors may be generated by the processor at 440. Each padded classifier vector may correspond to the one or more unpadded classifier vectors. Each generated classifier vector may be padded with a scalar corresponding to the classifier vector. A dot product between the padded video vector and at least one of the padded classifier vectors may be approximated at 450 as described earlier. In some configurations, a hash technique may be performed on at least one of the video vector and the classifier vector to approximate the dot product. In some configurations a nearest neighbor search may be performed based on the approximated dot product to identify at least one class (or object) present in the video. The use of hash-based methods and/or nearest neighbor methods described above in the context of images may be similarly applicable in the context of a video.

Figure 5:
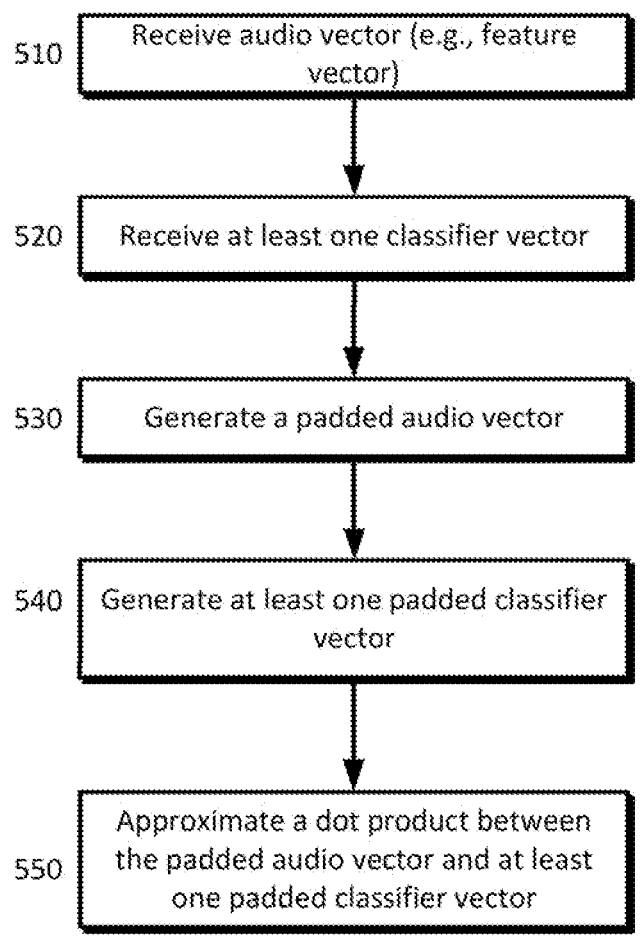
FIG. 5 is an example method for approximating a dot product between a padded audio vector and one or more padded classifier vectors.

According to an implementation of the disclosed subject matter, an example of which is provided in FIG. 5, one or more audio vectors may be received at 510. Audio may refer to an electrical representation of sound. One or more classifier vectors may be obtained at 520. Each classifier vector may correspond to at least one class. One or more padded audio vectors may be generated by a processor at 530 as described earlier. One or more padded classifier vectors may be generated by the processor at 540. Each generated classifier vector may correspond to the one or more unpadded classifier vectors. Each generated classifier vector may be padded with a scalar corresponding to the classifier vector. A dot product between the padded audio vector and each of the padded classifier vectors may be approximated at 550 as described earlier. In some configurations, a hash technique may be performed on at least one of the audio vector and the classifier vector to approximate the dot product. In some configurations a nearest neighbor search may be performed based on the approximated dot product to identify at least one class (or object) present in the audio. The use of hash-based methods and/or nearest neighbor methods described above in the context of images may be similarly applicable in the context of audio.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
receiving an image vector that represents an input digital image;
obtaining a plurality of classifier vectors, each classifier vector corresponding to at least one class;
generating, by one or more computers, a padded image vector;
generating, by the one or more computers, a plurality of padded classifier vectors comprising each of the plurality of classifier vectors padded with a scalar corresponding to the classifier vector; and
classifying, by the one or more computers, the input digital image as including an object from at least one of the classes corresponding to the classifier vectors by approximating a dot product between the padded image vector and at least one of the plurality of padded classifier vectors.

2. The method of claim 1, further comprising performing a hash technique on at least one of the image vector and the classifier vector to approximate the dot product.

3. The method of claim 2, wherein the hash technique is selected from the group consisting of: a locality sensitive hashing, a locality sensitive hashing with a random Gaussian projection, and random Gaussian projections.

4. The method of claim 1, further comprising performing a nearest neighbor search based on the approximated dot product to identify at least one class present in the image.

5. The method of claim 4, wherein the nearest neighbor search is selected from the group consisting of a tree-based search and a spill tree-based search.

6. The method of claim 1, wherein the image vector is padded with a zero.

7. The method of claim 1, further comprising:
receiving a plurality of additional image vectors that represent additional input digital images;
subtracting an adjustment value from the image vector and the plurality of additional image vectors;
generating, by the one or more computers, a plurality of additional padded image vectors where each additional padded image vector corresponds to one of the plurality of additional image vectors; and
classifying, by the one or more computers, the additional input digital images as including an object from at least one of the classes corresponding to the classifier vectors by approximating a dot product between the plurality of additional padded image vectors and at least one of the plurality of padded classifier vectors.

8. The method of claim 7, wherein the adjustment value comprises a mean of data comprising the image vector and plurality of additional image vectors.

9. The method of claim 1, further comprising applying a linear transformation to the image vector.

10. The method of claim 1, further comprising applying a linear transformation to the classifier vector.

11. The method of claim 1, further comprising randomly assigning a positive or negative value to the classifier vector for padding.

12. A computer-implemented method, comprising:
receiving a video vector that represents an input digital video;
obtaining a plurality of classifier vectors, each classifier vector corresponding to at least one class;
generating, by one or more computers, a padded video vector;
generating, by the one or more computers, a plurality of padded classifier vectors comprising each of the plurality of classifier vectors padded with a scalar corresponding to the classifier vector; and
classifying, by the one or more computers, the input digital video as including an object from at least one of the classes corresponding to the classifier vectors by approximating a dot product between the padded video vector and at least one of the plurality of padded classifier vectors.

13. The method of claim 12, further comprising performing a hash technique on at least one of the video vector and the classifier vector to approximated the dot product.

14. The method of claim 13, wherein the hash technique is selected from the group consisting of: a locality sensitive hashing, a locality sensitive hashing with a random Gaussian projection, and random Gaussian projections.

15. The method of claim 12, further comprising performing a nearest neighbor search based on the approximated dot product to identify at least one class present in the video.

16. The method of claim 15, wherein the nearest neighbor search is selected from the group consisting of a tree-based search and a spill tree-based search.

17. A computer-implemented method, comprising:
receiving an audio vector that represents an input digital audio;
obtaining a plurality of classifier vectors, each classifier vector corresponding to at least one audio type;
generating, by one or more computers, a padded audio vector;
generating, by the one or more computers, a plurality of padded classifier vectors comprising each of the plurality of classifier vectors padded with a scalar corresponding to the classifier vector; and
classifying, by the one or more computers, the input digital audio as including an audio type from at least one of the audio types corresponding to the classifier vectors by approximating a dot product between the padded audio vector and at least one of the plurality of padded classifier vectors.

18. The method of claim 17, further comprising performing a hash technique on at least one of the audio vector and the classifier vector to approximate the dot product.

19. The method of claim 18, wherein the hash technique is selected from the group consisting of: a locality sensitive hashing, a locality sensitive hashing with a random Gaussian projection, and random Gaussian projections.

20. The method of claim 17, further comprising performing a nearest neighbor search based on the approximated dot product to identify at least one class present in the audio.

21. The method of claim 20, wherein the nearest neighbor search is selected from the group consisting of a tree-based search and a spill tree-based search.

* * * * *